United States Patent
Alguera Gallego et al.

(10) Patent No.: US 6,371,504 B1
(45) Date of Patent: Apr. 16, 2002

(54) FIFTH WHEEL

(75) Inventors: José Manuel Alguera Gallego, Aschaffenburg; Frieder Mathis, Biblis; Wolfgang Pohl, Dreielch; Martin Schneider, Neu-Isenburg; Rainer Spitz, Eltville, all of (DE)

(73) Assignee: Jost-Werke GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/647,516

(22) PCT Filed: Mar. 30, 1999

(86) PCT No.: PCT/EP99/02190

§ 371 Date: Sep. 29, 2000

§ 102(e) Date: Sep. 29, 2000

(87) PCT Pub. No.: WO93/00248

PCT Pub. Date: Jan. 7, 1993

(30) Foreign Application Priority Data

Mar. 31, 1998 (DE) .......................... 198 14 274

(51) Int. Cl.$^7$ .............................. B62D 53/08
(52) U.S. Cl. ...................... 280/433; 384/421
(58) Field of Search .............. 280/433, 423.1, 280/438.1; 384/421, 420, 422

(56) References Cited

U.S. PATENT DOCUMENTS

| 3,887,251 A | * | 6/1975 | McKay | 280/421 |
| 4,169,635 A | * | 10/1979 | Szalay et al. | 280/433 |
| 5,165,713 A | * | 11/1992 | Picard | 280/433 |
| 5,431,424 A | * | 7/1995 | Colwell | 280/433 |
| 5,482,308 A | * | 1/1996 | Marcu | 280/433 |
| 5,746,438 A | * | 5/1998 | Bergmann et al. | 280/433 |
| 6,010,141 A | * | 1/2000 | Huntimer et al. | 280/433 |

FOREIGN PATENT DOCUMENTS

| DE | 25 35 151 | 2/1977 |
| DE | 35 30 467 | 3/1987 |
| DE | 3741330 | 6/1989 |
| DE | 44 18 533 | 11/1995 |
| DE | 296 03 641 | 8/1996 |
| EP | 0 117 319 | 9/1984 |
| EP | 0 130 402 | 1/1985 |
| EP | 0 566 420 | 10/1993 |
| EP | 0 792 793 | 9/1997 |
| WO | 93/00248 | 1/1993 |

* cited by examiner

Primary Examiner—Anne Marie Boehler
(74) Attorney, Agent, or Firm—Hudak & Shunk Co., L.P.A.

(57) ABSTRACT

Fifth wheels are used to establish an articulated connection between a truck tractor and a semi-trailer. They consist of a plate (1) which is attached to the truck tractor and generally has at least one arched slideway lining (4a,4b) acting as a bearing surface and fitting into corresponding recesses of the fifth wheel plate (1) where it is fastened. According to the invention, fastening is provided in the form of a positive fit connection, whereby the lower part of the slideway lining (4a,b) and the upper part of the plate (1) have joining elements (6,8) to ensure a rotationally locked positive fit, thus enabling thermal dilation to occur in the fifth wheel plate (1). Preferably, the positive fitting joining elements for the lower side of the slideway lining (4a,b) are configured as ribs (6) extending radially outwards from a virtual center point (7) and the positive fitting joining elements for the upper side of the fifth wheel plate (1) are configured as complementary grooves (6). Fastening elements such as screws or snap-in connections make sure that the fit remains positive.

5 Claims, 3 Drawing Sheets

FIFTH WHEEL

FIELD OF THE INVENTION

The invention concerns a fifth wheel coupling for the articulated connection of a tractor to a semitrailer, with a fifth wheel coupling plate resting on the double train, which has at least one arc-shaped sliding lining as bearing surface, secured to the coupling plate without twisting.

BACKGROUND OF THE INVENTION

Fifth wheel couplings are used for form-fitting, yet articulated connection of a tractor to a semitrailer, which then together form a so-called double train. The fifth wheel coupling has a fifth wheel plate with a V-shaped or mouth-like insertion cutout, also known as the coupling or capture mouth, which is bounded on both sides by a somewhat downward sloping horn. The insert cutout, the coupling mouth, passes into a central recess, in which a wearing ring can be arranged. On either side of the wearing ring, there are lock elements, especially a locking hook, which are disengaged from the central recess when the fifth wheel coupling is open. The coupling plate is permanently joined to the frame of the tractor primarily by means of bearing blocks and possibly a mounting plate.

On the semitrailer, at the bottom of the front end, there is an upper plate on which is arranged a downwardly pointing coupling or kingpin. In the coupling process, this pin is guided by the coupling mouth in the coupling plate and inserted into its central recess until it comes to lie against the wearing ring. The upper plate forms, as it were, the counterplate to the coupling plate. As soon as the kingpin lies against the wearing ring, the lock elements are brought into the locking position, whereupon the locking hook embraces the kingpin with form fit, yet able to rotate.

Fifth wheel couplings of the above kind are generally known and are largely standard equipment on double trains (DIN74080=ISO 337).

A significant major problem with such couplings is the friction between the coupling plate and the upper plate, especially because of the constant relative motions between them while traveling on curves, since the coupling plate in normal use is typically secured to the double train and unable to turn about a horizontal axis.

Numerous strategies have been adopted to reduce this fundamentally dictated friction.

One strategy is known to be (DE-PS 25 35 151; EP 0 130 402 B1) to employ a so-called plate lubrication, during which grease is placed between the two plates at regular, relatively short maintenance intervals.

As an alternative or to supplement the plate lubrication, there are known fifth wheels (DE 35 30 467 A1; EP 0 117 319 B1; DE 44 18 533 C2; DE 296 03 641 U1), in which a coating or fastening of antifriction materials to the coupling plate is provided. Usually these antifriction materials have the form of arc-shaped sliding coatings which preferably consist of plastic and which are embedded in corresponding recesses in the metallic collective coupling plate and secured there. The sliding layer can be bent like a horseshoe or have two or more approximately semicircular sliding layers, as in the case of the aforesaid DE 296 03 641 U1, which are screwed together with the coupling plate.

In such fifth wheels with sliding linings screwed onto the coupling plate, the following problems occur.

Since the sliding lining projects above the metallic coupling plate, so that the semitrailer with its upper plate can slide on it, the fastening screws of the sliding lining are heavily exposed to shear force due to the turning during operation of the semitrailer, so that under certain circumstances the fastening screws can break off.

The material of the sliding lining generally has a coefficient of thermal expansion higher than steel, the material from which the coupling plate itself is made. By the action of heat, e.g., by the sun or by high outdoor temperatures when using semitrailers in hot regions, the sliding lining then expands very greatly, which results in an additional mechanical loading of the fastening screws.

To address this problem, the aforesaid DE 296 03 641 U1, on which the invention is based, calls for making the surface of the cavity somewhat larger than is necessary to accommodate the sliding lining. Therefore, although the sliding lining can expand without being exposed to high stresses and breaking apart, the mechanical loading of the fastening screws still remains.

Even though the edges of the recess in which the sliding lining is embedded will absorb extreme transverse forces acting on the sliding linings, since the sliding linings cannot move to the side because of touching the inner wall of the recess, this effect only sets in when the movement has overcome the expansion gap, so that the heavy shear load on the fastening screws remains.

A form-fitting connection between sliding lining and coupling plate which prevents turning and allows a limited mobility is described in U.S. Pat. No. 5,482,308 and in EP 0 792 793 A2.

In U.S. Pat. No. 5,482,308, the connection is realized by a trapezoidal overlapping of the coupling plate with the sliding plate and also by wedges which run from the side of the sliding lining into the edge of the coupling plate. The trapezoidal projections of the sliding lining must be secured by means of trapezoidal fastening blocks and screws, for example. This makes it very time consuming to assemble the coupling plate or replace the sliding lining. During shear or thermal expansion, the forces primarily attack the trapezoidal projections, where material fatigue thus occurs rapidly.

In EP 0 792 793 A2, the sliding lining has bulges on the underside, which are form-fitted to complementary openings in the coupling plate. The coupling plate and the sliding lining are further held together by a screw passed through and a locking nut. Additional components are urgently needed for the fastening, such as a screw with locking nut. This increases the outlay when assembling the coupling plate or changing the sliding lining. Furthermore, at the fastening points the material wear is greatly increased by shear forces or thermal expansion of the sliding lining.

SUMMARY OF THE INVENTION

The purpose of the invention is to configure the above-designated fifth wheel such that a secure and thermally expandable fastening of the sliding lining is assured, even under strong shear forces.

The invention accomplishes this in that form-fitted connection elements on the underside of the sliding lining are formed as lands extending radially outward from a virtual midpoint in the opening of the coupling plate and the form-fitted connection elements are formed on the upper side of the coupling plate as grooves complementary to them.

The form-fitted connection, properly configured, absorbs the shear forces and thanks to the mutual movability of the connection elements of the form fit enables a thermal expansion of the sliding plate without noticeable mechanical load on the form-fitted connection.

Because of the radial direction of the lands and grooves in relation to the virtual midpoint of expansion in the central opening, the sliding lining can expand in the radial direction, without the form fit being impaired by this.

Since the lands/grooves run perpendicular to the applied rotational forces, i.e., the direction of rotation of the coupling plate, the sliding lining is protected against twisting, and the form-fitted connection naturally absorbs the transverse forces.

Thanks to the rib-like radial lands on the sliding lining, a stiffening of the sliding plate is achieved at the same time. This, in turn, can substantially diminish the wall thickness locally between the ribs, the lands, and this in turn can advantageously reduce the structural height of the fifth wheel and the weight of the sliding lining.

In order to ensure a secure form fit during use, according to another embodiment of the invention hold-down elements are provided in the form of screws, which join the sliding lining to the coupling plate without absorbing shear forces.

Therefore, in this case the screws only have the function of a securing, but no longer need to take up any forces. They can thus be dimensioned accordingly with less strength.

Alternatively, according to another embodiment of the invention, in order to ensure a secure form fit during use, hold-down elements in the form of clip-like, elastically flexible detente elements are provided at the free end of the lands, which can engage with the grooves of the coupling plate. The detente elements can thereby form a bulge or an outer collar.

In such an embodiment, the mounting of the sliding lining is also advantageously very simple. The sliding lining is simply forced from above with its lands into the grooves of the coupling plate, where the lands then engage to complete the form fit.

In a preferred embodiment, the lands have recesses at the side facing the coupling plate, which serve to accommodate expanding elements, which hold the detente elements in the engaged condition. The depth of the recesses can correspond to the depth of the lands. The expanding elements can be introduced by hand into the recesses and force the detente elements against the coupling plate.

Other advantages and configurations of the invention will result from the description of the sample embodiments presented in the drawings.

BRIEF DESCRIPTION OF THE DRAWINGS

These show.

DETAILED DESCRIPTION OF THE INVENTION

Figure 4:
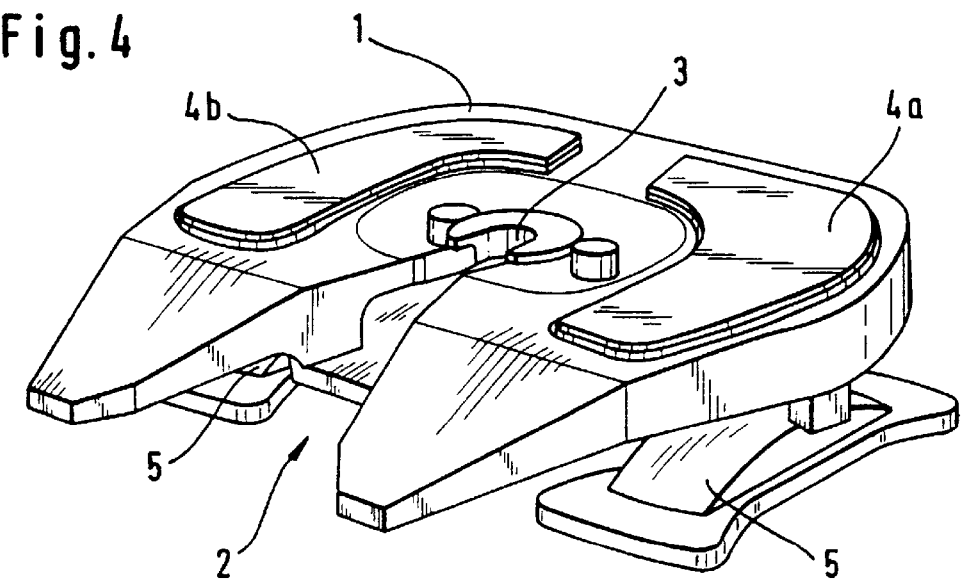

The fifth wheel shown in FIG. 4 serves to join together a tractor with a semitrailer. It has a coupling plate 1 resting on the double train via bearing blocks 5, having a V-shaped coupling mouth 2 with a central opening 3 to receive and lock a kingpin permanently arranged on the semitrailer (not shown). The coupling plate 1 has, as its bearing surface, two roughly semicircularly curved sliding linings 4a and 4b, which in this example are placed in corresponding recesses of the coupling plate 1 and secured there in familiar fashion. It is also possible to have more than two sliding linings. The sliding linings can also be secured on the plate.

The fifth wheel of the invention as shown in FIGS. 1 to 3 and 5 has a form-fitted connection between the sliding linings 4a, 4b and the coupling plate 1, in that connection elements for a form fit that resists twisting and enables a thermal expansion of the sliding plates are provided on the bottom of the sliding linings, on the one hand, and on the top of the coupling plate 1, on the other.

Figure 1:
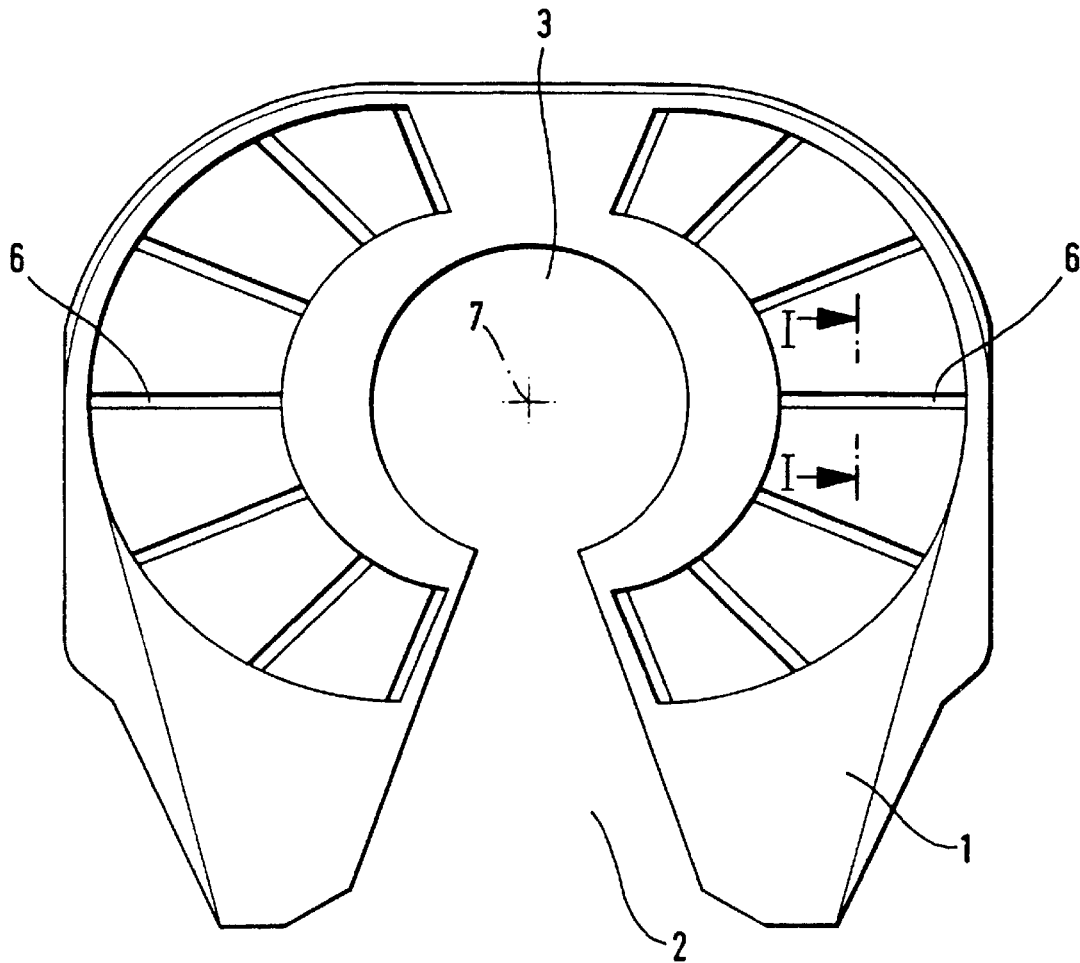
FIG. 1, a top view of the invention's coupling plate with the sliding linings removed, FIG. 2, a partial cross section view of the invention's fifth wheel along line I—I in FIG. 2 with sliding lining inserted and an outer collar providing the form fitting, FIG. 3, likewise a partial cross sectional view corresponding to FIG. 2 with sliding lining form-fitted in the coupling plate and securement of the form fit by an inner collar, FIG. 4, a conventional fifth wheel with two sliding linings curved into semicircles, FIG. 5a+b, additional partial cross sectional views corresponding to FIG. 2, without and with expanding element.

According to FIG. 1, the form-fitted connection elements are fashioned on the top of the coupling plate 1 as grooves 6 which extend radially outward from a virtual midpoint 7 in the opening 3. Accordingly, the form-fitted connection elements on the bottom of the sliding linings are formed as radially extending lands 8. The sliding linings can have both peripherally inward or outward arc-shaped lands, although no grooves are formed for them in the coupling plate, in order to ensure unhindered expansion in the radial direction. In addition to the form fit by the lands 8, screws can also be provided as securement, being preferably in the region of the lands, so that the lands 8 cannot be forced out of the grooves 6 by thermal expansion. The diameters of the screw holes must be larger by a certain amount than the diameter of the screws, in order to provide a corresponding freedom of movement. Because of the radial direction of the lands 8 and grooves 6, in terms of the virtual midpoint of rotation 7 in the central opening 3, the sliding linings 4a, b can expand in the radial direction. But since the lands 8 and the grooves 6 run perpendicular to the attacking forces of rotation, i.e., the direction of rotation of the coupling plate, the sliding linings 4a, b are secured against twisting, and the form-fitted connection between lands and grooves naturally absorbs the transverse forces.

As can be seen from FIG. 1, the rib-like radial lands 8 also achieve a stiffening of the sliding plates at the same time. Therefore, in turn, the wall thickness between the ribs, or lands 8, can be considerably reduced locally, so that in turn the structural height of the coupling plate and the weight of the sliding linings can advantageously be reduced significantly.

Figure 2:
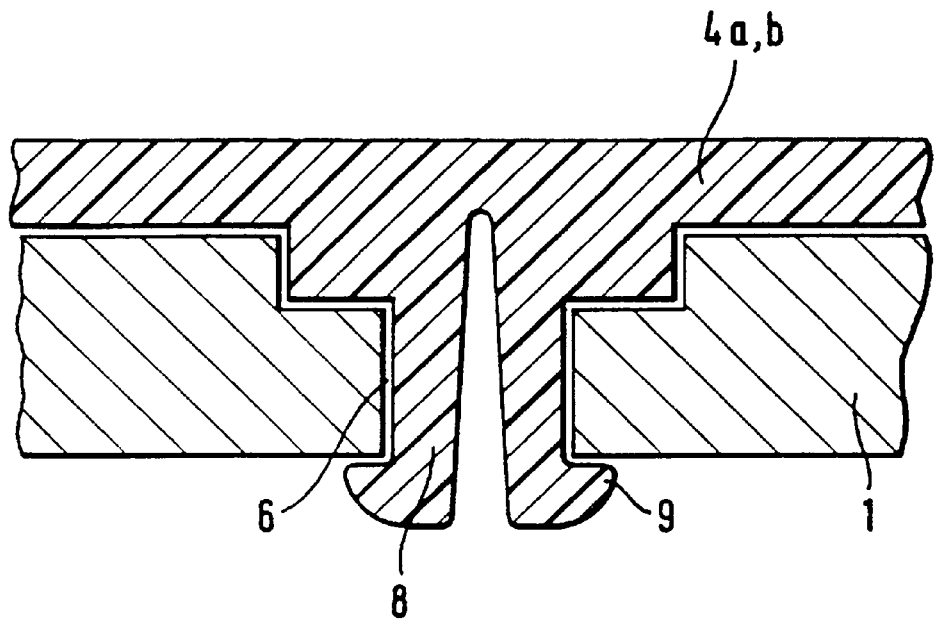
Figure 3:
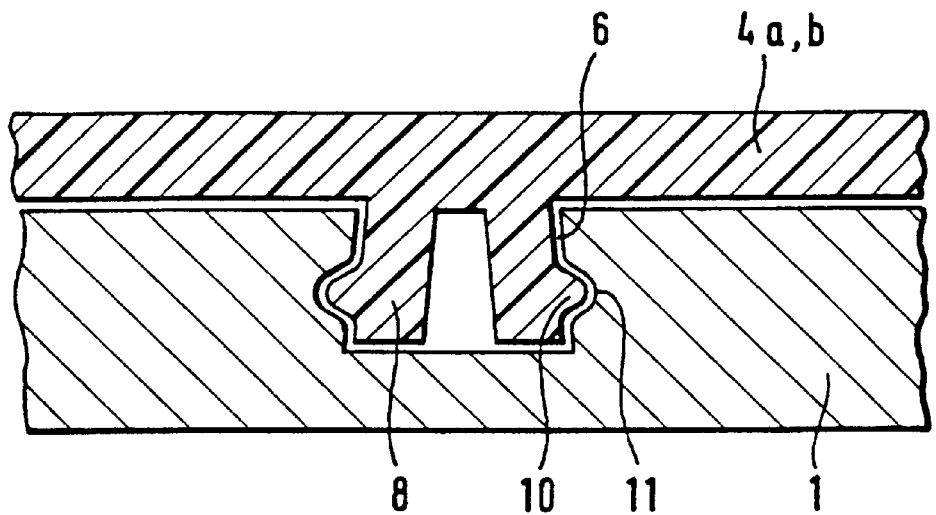

In order to maintain the form fit, two configurations of hold-down elements are provided in FIGS. 2 and 3 in the form of clip-like, elastically flexible detente elements at the free end of the lands 8, which can engage with the grooves 6 of the coupling plate 1. In such a configuration, the mounting of the sliding linings 4a, b is advantageously very simple. The sliding linings are merely forced from above with their lands 8 into the grooves 6 of the coupling plate 1, where the lands then engage.

In the embodiment of FIG. 2, the depth of the grooves 6 corresponds to the thickness of the coupling plate 1, i.e., the grooves form a corresponding opening in the coupling plate. The detente elements of the slotted lands 8 are fashioned as outer collars 9, which engage with the underside of the coupling plate 1.

In the embodiment of FIG. 3, the depth of the grooves 6 in the coupling plate 1 corresponds to only one part of their thickness and the detente elements of the lands 8 are fashioned as a thickening, i.e., as a bulge 10, which engage with complementary recesses 11 in the side walls of the grooves.

The sliding linings 4a, b are preferably an injection molded piece, while the expanding dowel-like ends of the lands 8 with their hold-down elements 9, 10 are molded at the same time during the injection molding process.

The geometrical structure of the sliding lining can also be different than shown in FIG. 4. For example, there could be one sliding lining per quadrant.

Figure 5A:
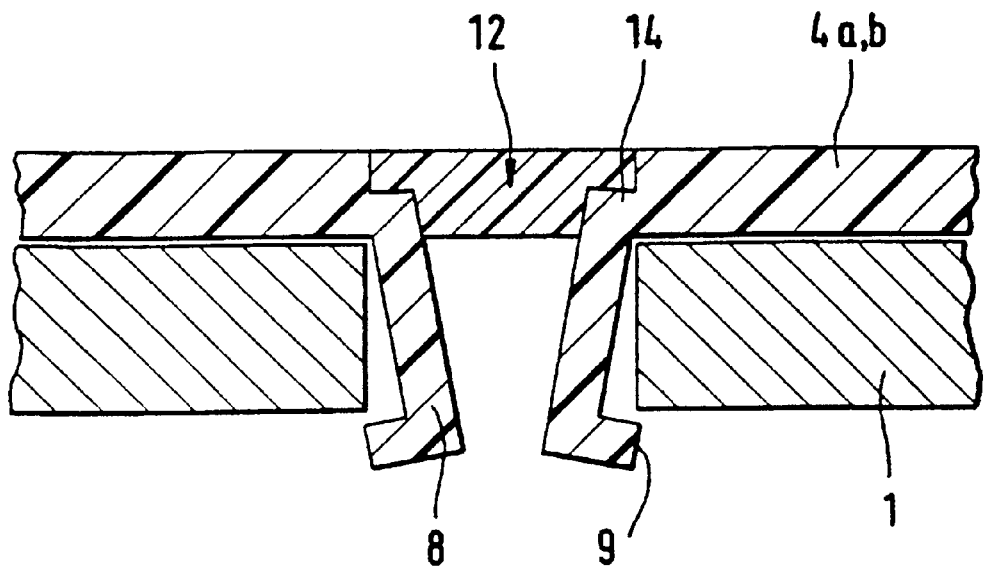
Figure 5B:
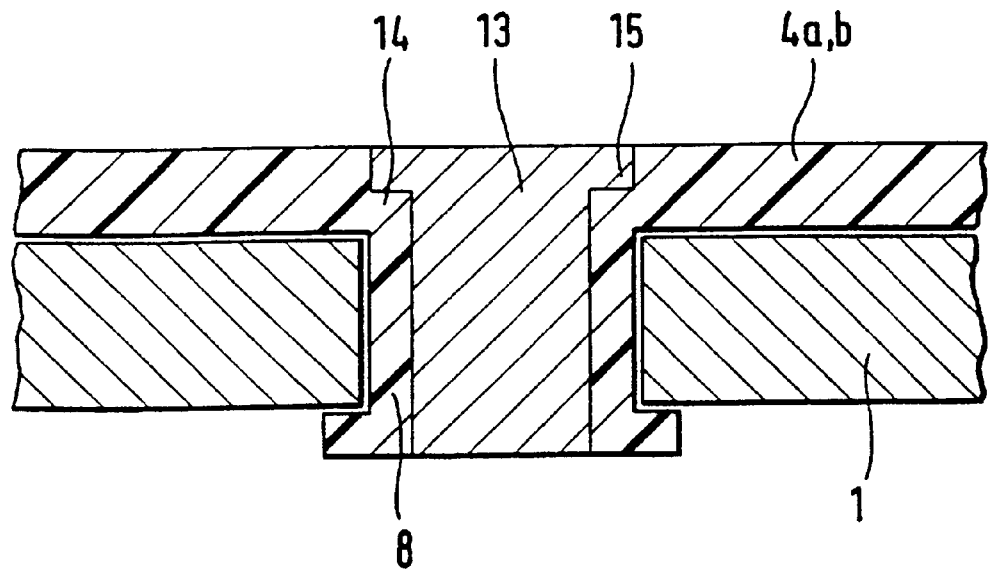

FIGS. 5a and b show a sliding lining whose land 8 has a recess 12. In the case shown here, the detente elements of the land 8 are fashioned as an outer collar 9 (see also FIG. 2). They could also be fashioned as a bulge 10 by analogy with the embodiment shown in FIG. 3. In both cases, the recess 12 passes straight through the land 8 in the vertical direction. On the upper side of the sliding lining 4a, b, the recess 12 is configured such as to produce a shoulder 14. The length of the recess 12 parallel to the land 8 is arbitrary, but always shorter than the land 8 itself.

The expanding element 13 is fashioned complementary to the recess 12, so that it engages in form fit with the recess 12 and is flush with the sliding surface. The expanding element 13 can consist of any desired material, preferably metal or plastic. The expanding element 13 is fashioned as a bolt (round or angular) or as a molding, depending on the length of the recess 12. It has a collar 15 fitted to the shoulder 14. In the direction perpendicular to the sliding lining 4a, b, the expanding element 13 is at least so long that it presses the detente elements of the land 8 against the edge of the groove in the coupling plate 1 so that the detente elements firmly engage with the coupling plate 1. In the sample embodiment depicted in FIG. 5b, the expanding element 13 is so long that it terminates flush with the detente elements of the land 8.

What is claimed is:

1. A fifth wheel for articulated connection of a tractor to a semitrailer, comprising: a coupling plate supported on the tractor, having as its bearing surface at least one arc-shaped sliding lining, which is secured to the coupling plate so that it cannot twist, wherein the bottom side of the sliding lining has form-fitted connection elements fashioned as lands extending radially outward from a virtual midpoint in an opening in the coupling plate, wherein the upper side of the coupling plate has form-fitted connection elements fashioned as complementary grooves to cooperate with said lands, and wherein to maintain the form-fit, hold-down elements are provided in the form of elastically flexible detente elements at the free end of the lands, which can engage with the grooves of the coupling plate.

2. A fifth wheel according to claim 1, wherein the depth of the grooves in the coupling plate are fashioned such that they correspond to their thickness and the detente elements of the lands are fashioned as expanded ends with an outer collar, which engage with the bottom side of the coupling plate.

3. A fifth wheel according to claim 1, wherein the depth of the grooves in the coupling plate corresponds to only a portion of their thickness and the detente elements are fashioned as expanded land ends with a bulge, which engage with complementary recesses in the side wall of the grooves.

4. A fifth wheel according to claim 2, wherein the lands of the side away from the coupling plate have recesses to accommodate expanding elements which hold the detente elements in the engaged condition.

5. A fifth wheel according to claim 1, wherein two or more than two sliding linings are provided.

* * * * *